(12) United States Patent
Tachikawa et al.

(10) Patent No.: US 9,073,426 B2
(45) Date of Patent: Jul. 7, 2015

(54) POWER SUPPLY SYSTEM FOR ELECTRIC VEHICLE

(71) Applicant: HONDA MOTOR CO., LTD., Tokyo (JP)

(72) Inventors: Kosuke Tachikawa, Wako (JP); Yuichi Mochizuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 389 days.

(21) Appl. No.: 13/652,479

(22) Filed: Oct. 16, 2012

(65) Prior Publication Data
US 2013/0119757 A1 May 16, 2013

(30) Foreign Application Priority Data

Nov. 14, 2011 (JP) .................................. 2011-248431

(51) Int. Cl.
*B60K 1/04* (2006.01)
*B60L 11/00* (2006.01)
*B60K 1/00* (2006.01)

(52) U.S. Cl.
CPC . *B60K 1/04* (2013.01); *B60L 11/00* (2013.01); *B60K 2001/005* (2013.01); *B60K 2001/0438* (2013.01); *B60K 2001/0455* (2013.01); *B60Y 2306/01* (2013.01)

(58) Field of Classification Search
CPC . Y02T 10/7005; Y02T 10/7077; B60R 16/03; B60R 16/0315; B60L 11/14; B60L 11/00; B60K 1/04; B60K 2001/005; B60K 2001/0438; B60K 2001/0455; B06Y 2306/01
USPC .......................................................... 307/9.1
See application file for complete search history.

(56) References Cited

U.S. PATENT DOCUMENTS

| 5,534,364 | A | * | 7/1996 | Watanabe et al. ................ 429/61 |
| 5,744,873 | A | * | 4/1998 | Hasegawa et al. ........... 307/10.1 |
| 5,864,106 | A | * | 1/1999 | Hartwig et al. .............. 200/17 R |
| 5,942,737 | A | * | 8/1999 | Waters et al. .............. 200/50.28 |
| 6,087,737 | A | * | 7/2000 | Alksnat et al. ................ 307/10.7 |
| 6,646,845 | B1 | * | 11/2003 | Turner et al. ..................... 361/86 |
| 7,557,460 | B2 | * | 7/2009 | Yugou ........................... 307/10.7 |
| 2005/0200201 | A1 | * | 9/2005 | Jabaji et al. .................. 307/10.1 |

(Continued)

FOREIGN PATENT DOCUMENTS

JP 2008-53128 3/2008

*Primary Examiner* — Thienvu Tran
*Assistant Examiner* — Brian K Baxter
(74) *Attorney, Agent, or Firm* — Mori & Ward, LLP

(57) ABSTRACT

A power supply system for an electric vehicle includes a battery, a power line, a connector, a separating operation device, a switch device, a switching operation member, and an interlock member. The switch device is configured to interrupt an electrical connection between the battery and the connector. The switching operation member is configured to be operated by an operator to open the switch device to interrupt the electrical connection. The interlock member is movable from a first position to a second position if the switching operation member has been operated by the operator to open the switch device to interrupt the electrical connection. The interlock member is configured to prohibit, at the first position, the operator from operating the separating operation device. The interlock member is configured to allow, at the second position, the operator to operate the separating operation device.

14 Claims, 6 Drawing Sheets

(56) References Cited

U.S. PATENT DOCUMENTS

| | | |
|---|---|---|
| 2006/0284579 A1* | 12/2006 | Asakura et al. ............... 318/139 |
| 2007/0145942 A1* | 6/2007 | Yamamoto et al. ........... 320/104 |
| 2008/0061764 A1* | 3/2008 | Tae et al. ........................ 324/72 |
| 2008/0074082 A1* | 3/2008 | Tae et al. ....................... 320/136 |
| 2008/0211459 A1* | 9/2008 | Choi ............................. 320/134 |
| 2009/0021221 A1* | 1/2009 | Krauer et al. ................. 320/153 |
| 2010/0127565 A1* | 5/2010 | Fukazu et al. ................. 307/9.1 |
| 2011/0043393 A1* | 2/2011 | Tamura ......................... 341/119 |

* cited by examiner

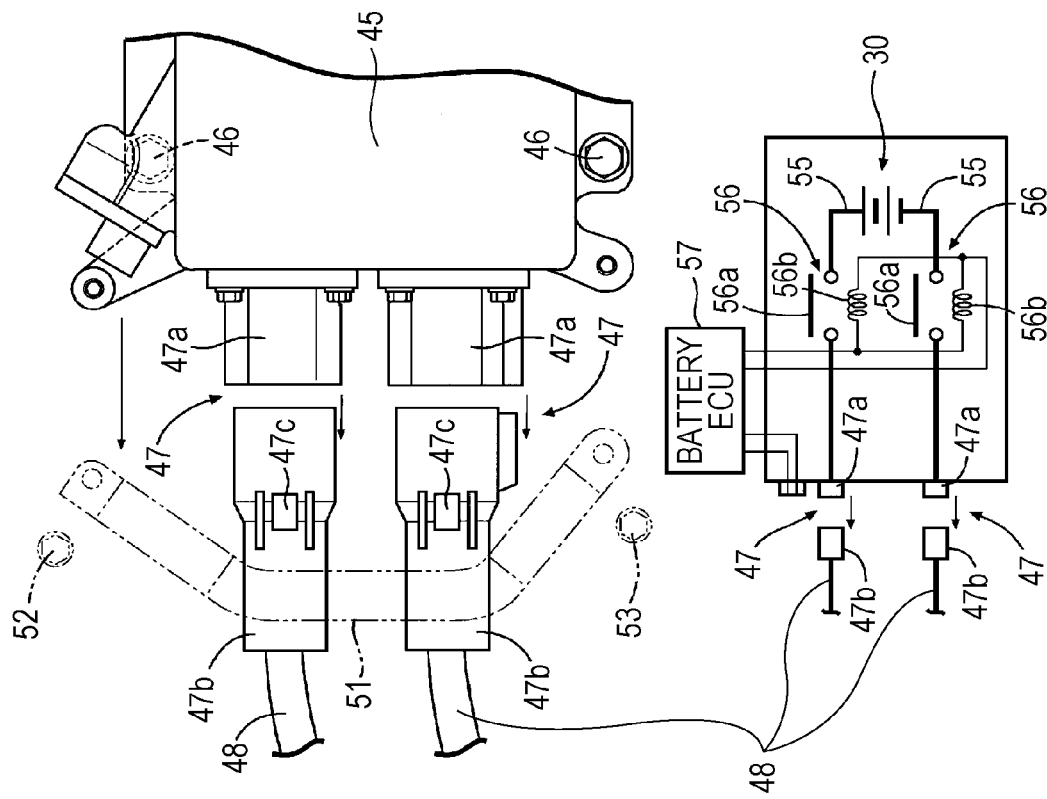
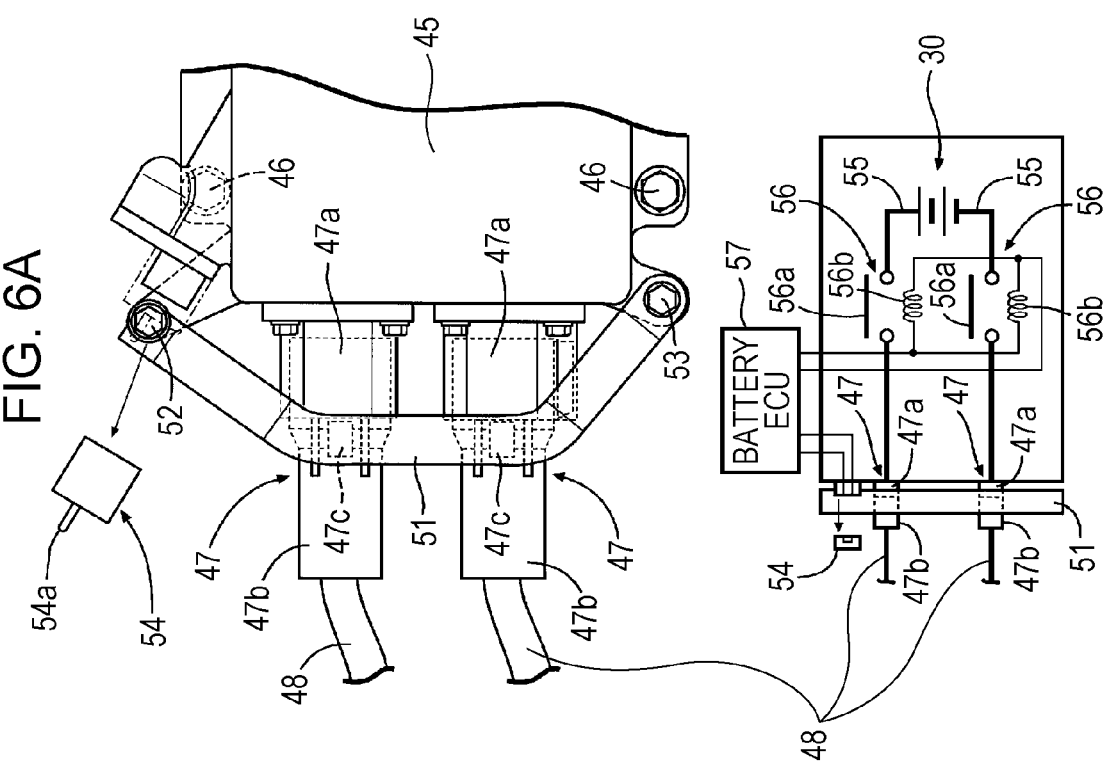

POWER SUPPLY SYSTEM FOR ELECTRIC VEHICLE

CROSS-REFERENCE TO RELATED APPLICATIONS

The present application claims priority under 35 U.S.C. §119 to Japanese Patent Application No. 2011-248431, filed Nov. 14, 2011, entitled "Power Supply System for Electric Vehicle." The contents of this application are incorporated herein by reference in their entirety.

BACKGROUND OF THE INVENTION

1. Field of the Invention

The present application relates to a power supply system for an electric vehicle.

2. Discussion of the Background

Japanese Unexamined Patent Application Publication No. 2008-53128 discloses a configuration in which a lid that covers an upper opening of a body case containing a battery is connected to a breaker that breaks an electrical connection between the battery and a connector, such that the lid and the breaker can be interlocked with each other. In this configuration, when the lid is opened for battery maintenance, the breaker is automatically held at the breaking position.

When a connector of a power line that supplies power to a power drive unit of a motor generator is removed from a battery pack for maintenance etc., it is necessary to separate the connector from batteries so that a high voltage is not applied to the connector. In the technique disclosed in Japanese Unexamined Patent Application Publication No. 2008-53128, an operator pulls out a service plug to interrupt the application of a high voltage to the connector.

SUMMARY OF THE INVENTION

According to one aspect of the present invention, a power supply system for an electric vehicle includes a battery, a power line, a connector, a separating operation device, a switch device, a switching operation member, and an interlock member. The battery is mounted on a vehicle body of the electric vehicle. Power is to be supplied via the power line from the battery to an electric apparatus provided in the electric vehicle. The connector is to removably connect the power line to the battery. The separating operation device is mounted on the connector and is configured to be operated by an operator to disconnect the connector. The switch device is configured to interrupt an electrical connection between the battery and the connector. The switching operation member is configured to be operated by the operator to open the switch device to interrupt the electrical connection. The interlock member is movable from a first position to a second position if the switching operation member has been operated by the operator to open the switch device to interrupt the electrical connection. The interlock member is configured to prohibit, at the first position, the operator from operating the separating operation device. The interlock member is configured to allow, at the second position, the operator to operate the separating operation device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6A and FIG. 6B illustrate actions that take place in separation of high-voltage connectors.

DESCRIPTION OF THE EMBODIMENTS

Figure 1:
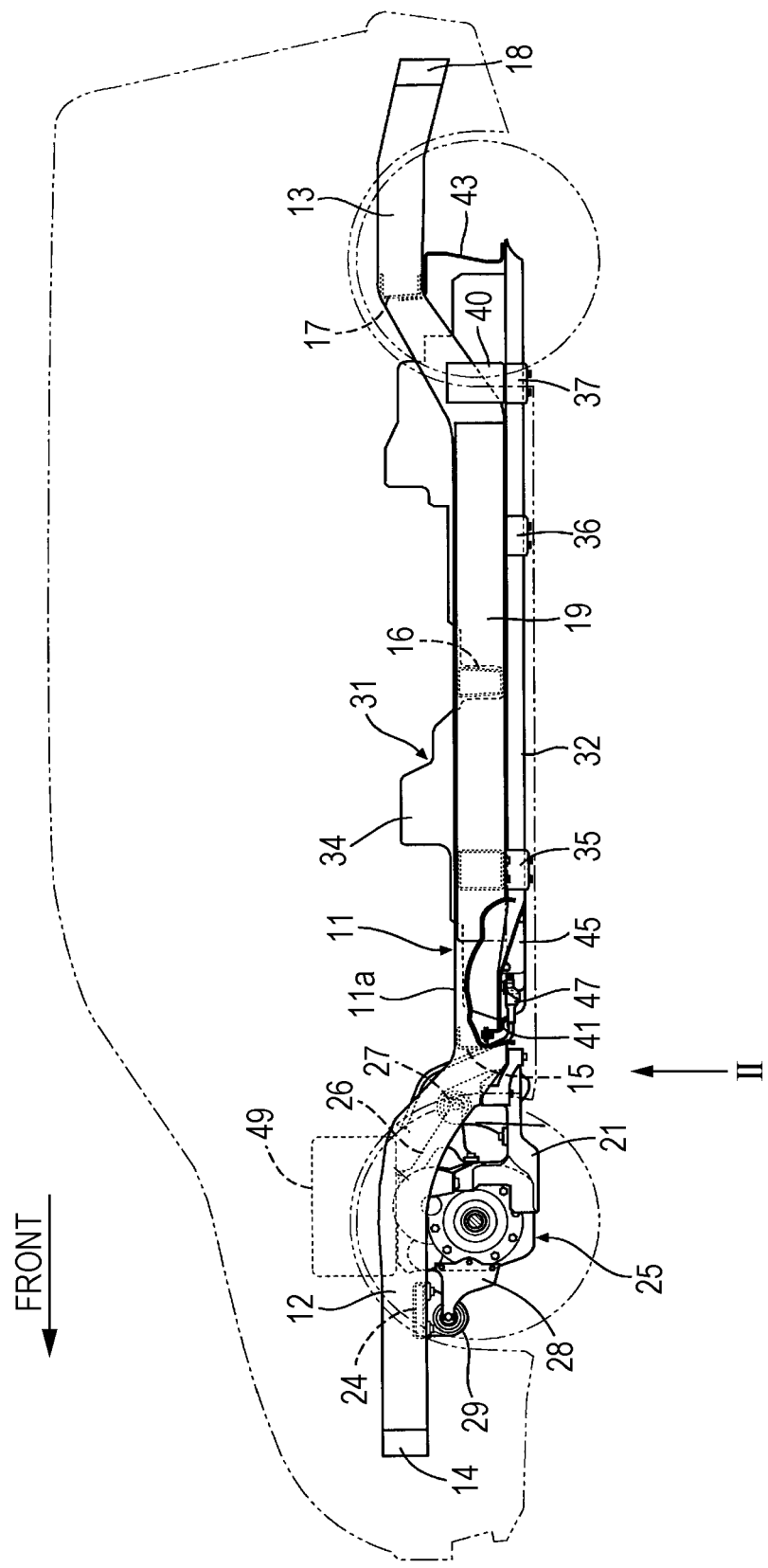
FIG. 1 is a side view of an electric vehicle.

The embodiments will now be described with reference to the accompanying drawings, wherein like reference numerals designate corresponding or identical elements throughout the various drawings.

As illustrated in FIG. 1 to FIGS. 3A and 3B, a vehicle body frame of an electric vehicle includes a pair of left and right floor frames 11 and 11 extending in the front and rear direction of the vehicle body. A pair of left and right front side frames 12 and 12 extends frontward and upward from respective front ends of the left and right floor frames 11 and 11. A pair of left and right rear side frames 13 and 13 extends rearward and upward from respective rear ends of the left and right floor frames 11 and 11.

Front ends of the left and right front side frames 12 and 12 are connected to each other by a front bumper beam 14 extending in the vehicle width direction. Front ends of the left and right floor frames 11 and 11 are connected to each other by a front cross member 15 extending in the vehicle width direction. Middle portions of the left and right floor frames 11 and 11 in the front and rear direction of the vehicle body are connected to each other by a middle cross member 16 extending in the vehicle width direction. Middle portions of the left and right rear side frames 13 and 13 in the front and rear direction of the vehicle body are connected to each other by a rear cross member 17 extending in the vehicle width direction. Rear ends of the left and right rear side frames 13 and 13 are connected to each other by a rear bumper beam 18 extending in the vehicle width direction.

A pair of left and right side sills 19 and 19 is disposed outside the left and right floor frames 11 and 11 in the vehicle width direction and extends in the front and rear direction of the vehicle body. Front ends of the left and right side sills 19 and 19 and rear ends of the left and right front side frames 12 and 12 are connected to each other by a pair of left and right front outriggers 20 and 20 extending in the vehicle width direction. Rear ends of the left and right side sills 19 and 19 are connected to respective front ends of the left and right rear side frames 13 and 13.

A plate-like front subframe 21 is secured at the front thereof, with one bolt 22 each on the left and right sides, to lower surfaces of middle portions of the front side frames 12 and 12 in the front and rear direction of the vehicle body. The front subframe 21 is also secured at the rear thereof, with two bolts 23 and 23 each on the left and right sides, to lower surfaces of rear portions of the front side frames 12 and 12. Front portions of the left and right front side frames 12 and 12 are connected to each other by a front mount beam 24 extending in the vehicle width direction. A motor generator 25 serving as a drive source for running the electric vehicle is provided with a rear mount bracket 26 at the rear thereof supported by a rear mount 27 on an upper surface of the front subframe 21. The motor generator 25 is also provided with a pair of left and right front mount brackets 28 and 28 at the front thereof supported by a pair of left and right front mounts 29 and 29 on a lower surface of the front mount beam 24.

A battery pack 31 (a fixed device, a battery housing) that contains a plurality of battery modules 30 (see FIG. 2) serving as a power source for the motor generator 25 includes a metal battery tray 32 and a battery cover 34. The battery tray 32 holds the battery modules 30, and the battery cover 34 is attached to the battery tray 32 with a plurality of bolts 33 on an upper surface of the battery tray 32. The battery tray 32 has an internal hollow space through which cooling air passes to cool the battery modules 30.

Three suspended beams 35, 36, and 37 extending in the vehicle width direction are secured with bolts 38 to a lower surface of the battery pack 31. The suspended beam 35 on the foremost side is secured at both ends thereof, with bolts 39, to lower surfaces of the left and right floor frames 11 and 11. The suspended beam 36 in the middle is secured at both ends thereof to the lower surfaces of the left and right floor frames 11 and 11. The suspended beam 37 on the rearmost side is secured at both ends thereof, through a pair of left and right brackets 40 and 40, to side faces of the left and right rear side frames 13 and 13. A bracket 41 at a front end of the battery pack 31 is secured with bolts 42 and 42 to a lower surface of the front cross member 15. A bracket 43 at a rear end of the battery pack 31 is secured with bolts (not shown) to a lower surface of the rear cross member 17.

When the battery tray 32 is supported by the vehicle body frame, a rear end of the front subframe 21 and a protruding portion 32a protruding frontward from the front end of the battery pack 31 face each other in the front and rear direction, with a predetermined gap α (see FIG. 2) interposed therebetween.

Oblique portions (each surrounded by a two-dot chain line in FIG. 2) at the front of the left and right floor frames 11 and 11 are shock absorbing members 11a and 11a. The shock absorbing members 11a and 11a are not designed to be crushable zones which are particularly breakable, but they can be collapsed when excessive shock is input to the vehicle in the event of a front-end collision. In such a front-end collision of the vehicle, other parts of the vehicle body frame, other than the shock absorbing members 11a and 11a, can also be collapsed. Since the front subframe 21 and the battery pack 31 have high rigidity, the amount of their deformation in the event of the front-end collision is smaller than the amount of deformation of the shock absorbing members 11a and 11a.

Figure 5:
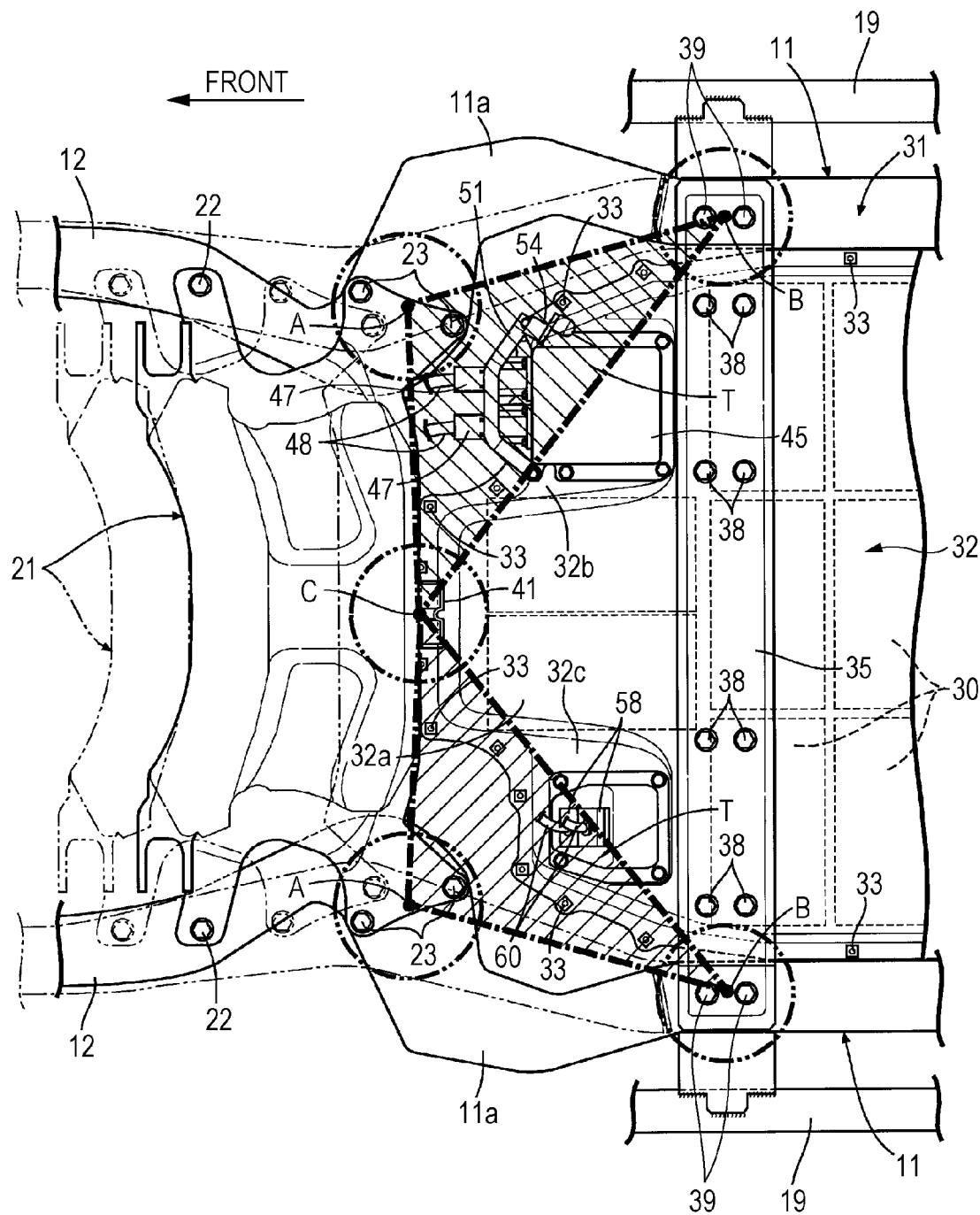
FIG. 5 illustrates an action that takes place in the event of a front-end collision.

As illustrated in FIG. 5, areas where the shock absorbing members 11a and 11a of the floor frames 11 and 11 are connected at front ends thereof, with the bolts 23, to both left and right ends of the front subframe 21 are first connection portions A and A. Similarly, areas where the shock absorbing members 11a and 11a of the floor frames 11 and 11 are connected at rear ends thereof, with the bolts 39, to both left and right ends of the battery pack 31 (i.e., to both left and right ends of the suspended beam 35 on the foremost side) are second connection portions B and B.

Figure 2:
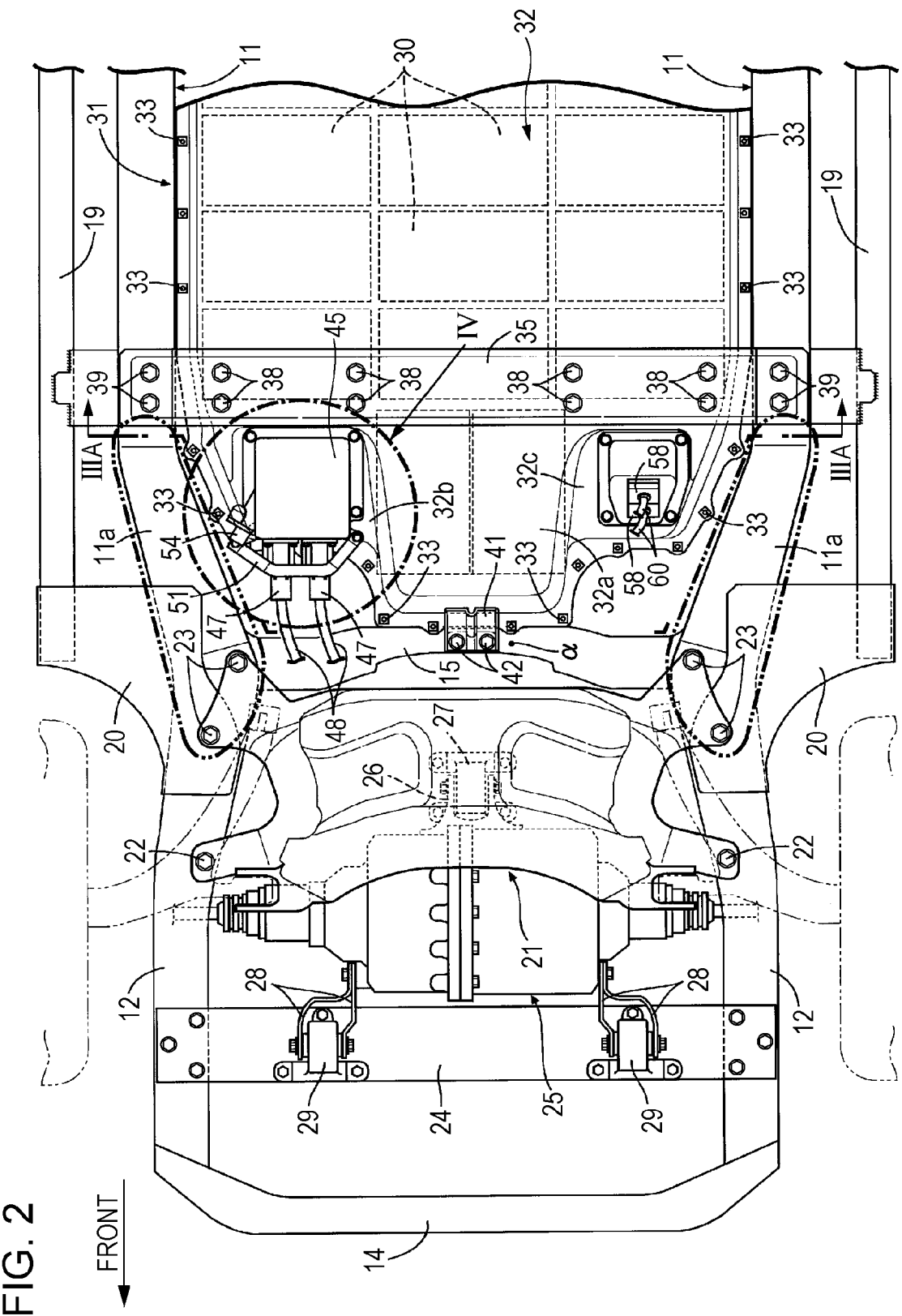
FIG. 2 illustrates the electric vehicle as viewed in the direction of arrow II in FIG. 1.
Figure 3:
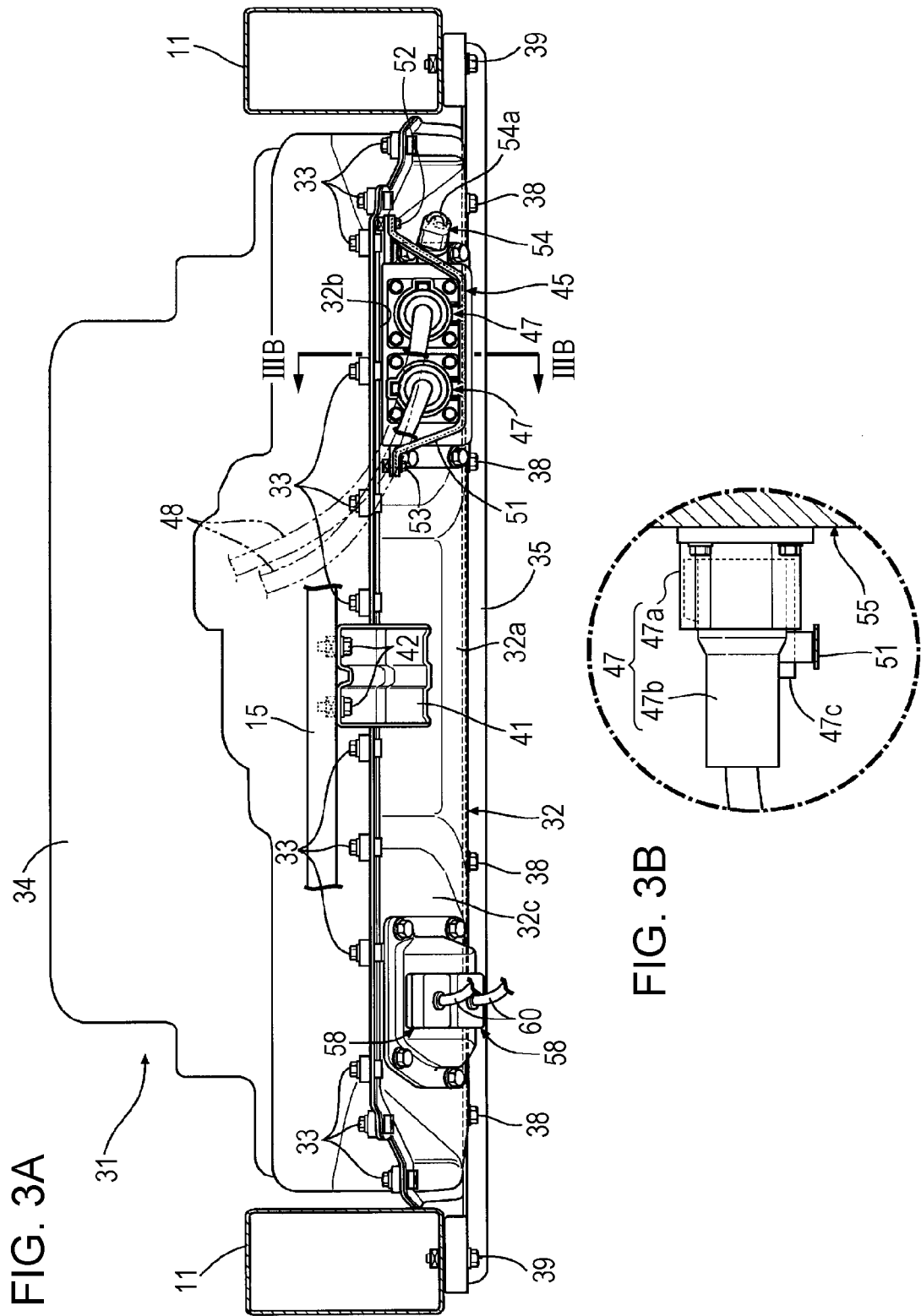
FIG. 3A is a cross-sectional view taken along line IIIA-IIIA of FIG. 2.
FIG. 3B is a cross-sectional view taken along line IIIB-IIIB of FIG. 3A.
Figure 4:
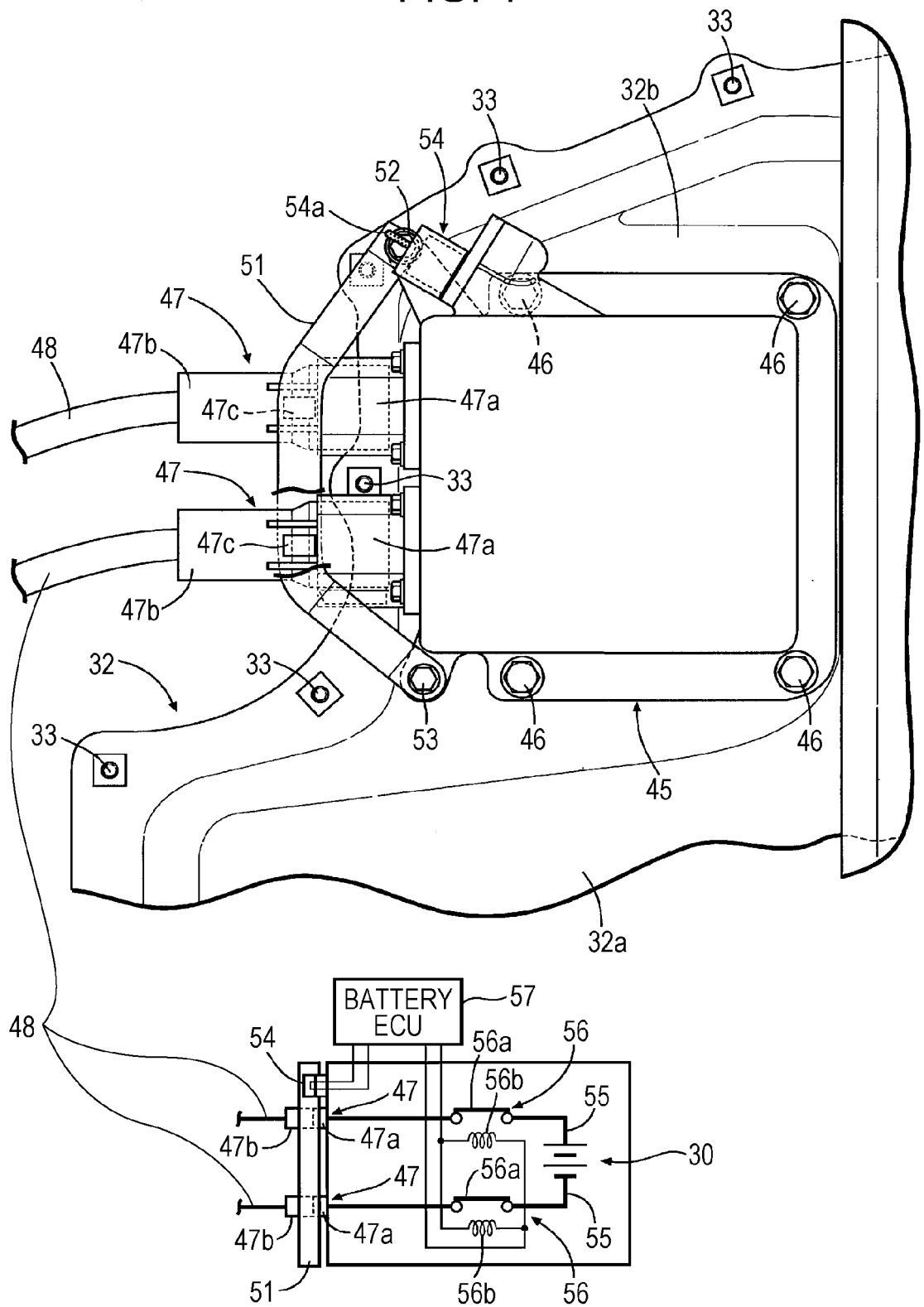
FIG. 4 is an enlarged view of area IV in FIG. 2.

As illustrated in FIG. 2 to FIG. 4, the battery tray 32 of the battery pack 31 has a recessed portion 32b at the rear and to the left of the protruding portion 32a. The recessed portion 32b is recessed upward. A high-voltage connector box 45 is secured with four bolts 46 to the recessed portion 32b. A pair of high-voltage connectors 47 and 47 (a connector) includes female connectors 47a and 47a (a first connector) secured to the front of the high-voltage connector box 45, and male connectors 47b and 47b (a second connector) that can be inserted into and removed from the female connectors 47a and 47a in the front and rear direction. Two high-voltage (e.g., 288 V) power lines 48 and 48 (a power line) extending from the respective female connectors 47a and 47a are connected to a power drive unit 49 (see FIG. 1) that controls the activation of the motor generator 25.

An interlock member 51 formed by a bent plate is secured, at both ends thereof, with two bolts 52 and 53 which are inserted upward from below and screwed into the lower surface of the battery tray 32. Lower surfaces of the female connectors 47a and 47a are provided with unlocking buttons 47c and 47c (a separating operation device). Unless the unlocking buttons 47c and 47c are pressed, the male connectors 47b and 47b are locked so as not to be removed from the female connectors 47a and 47a. When the interlock member 51 is secured to the battery tray 32, the interlock member 51 is in the way and prevents the unlocking buttons 47c and 47c from being operated.

An interlock connector 54 (a switching operation member) having a handle 54a is placed on a side face of the high-voltage connector box 45 such that it can be inserted into and removed from the high-voltage connector box 45. The handle 54a of the interlock connector 54 inserted on the side face of the high-voltage connector box 45 is located on the axis of the bolt 52 with which one end of the interlock member 51 is secured.

Contacts 56a and 56a of two relays 56 and 56 are placed between terminals 55 and 55 on both ends of the plurality of series-connected battery modules 30 and the pair of high-voltage connectors 47 and 47. Coils 56b and 56b facing the respective contacts 56a and 56a are connected to a battery electronic control unit (ECU) 57 (a switch device, a detector), to which the interlock connector 54 is connected.

The battery tray 32 of the battery pack 31 has a recessed portion 32c at the rear and to the right of the protruding portion 32a. The recessed portion 32c is recessed upward. Female connectors of low-voltage connectors 58 and 58 are secured with four bolts to the recessed portion 32c. Two low-voltage (e.g., 12 V) power lines 60 and 60 extending from male connectors that can be inserted into and removed from the female connectors are connected to various vehicle-mounted devices.

The function of embodiments having the above-described configuration will now be described.

On the lower surface of the vehicle body frame, the rear end of the front subframe 21 on the front side and the front end of the battery pack 31 on the rear side face each other, with the gap α (see FIG. 2) interposed therebetween. If an excessive collision load is input, in the front and rear direction of the vehicle body, to the front side frames 12 and 12 by a front-end collision, the shock absorbing members 11a and 11a formed by front portions of the floor frames 11 and 11 connected to the rear ends of the front side frames 12 and 12 are buckled as illustrated in FIG. 5. Thus, the front subframe 21 is retracted and brings its rear end into contact with the front end of the battery pack 31.

If the front subframe 21 and the battery pack 31 can come into contact with each other at a contact point C, a pair of left and right triangular regions T and T (each indicated by a dash-dot chain line in FIG. 5) can be formed by the first connection portions A and A, the second connection portions B and B, and the contact point C. The triangular regions T and T are of high rigidity surrounded by the front subframe 21, the battery pack 31, and the shock absorbing members 11a and 11a buckled by the collision load. The high-voltage connectors 47 and 47 are disposed within one of the triangular regions T and T and the low-voltage connectors 58 and 58 are disposed within the other of the triangular regions T and T.

This can provide protection to the high-voltage connectors 47 and 47 and the low-voltage connectors 58 and 58.

As described above, since the triangular regions T and T are defined on the basis of the positions of the first connection portions A and A, the second connection portions B and B, and the contact point C after the shock absorbing members 11*a* and 11*a* are deformed by the collision load, it is possible to more reliably prevent the high-voltage connectors 47 and 47 and the low-voltage connectors 58 and 58 from being damaged by collision. In particular, if the high-voltage connectors 47 and 47 are damaged and a ground fault occurs in the vehicle body frame, there is a danger of electric shock. With the configuration of the present embodiment, it is possible to reliably prevent occurrence of the ground fault.

For example, when the male connectors 47*b* and 47*b* are pulled out of the female connectors 47*a* and 47*a* of the high-voltage connectors 47 and 47 for replacement of the battery pack 31, there is a danger of electric shock if a voltage as high as 288 V is applied to the high-voltage connectors 47 and 47. To prevent electric shock, it is necessary to interrupt in advance the application of a high voltage to the high-voltage connectors 47 and 47. When the interlock connector 54 is pulled out as illustrated in FIG. 6A, the battery ECU 57 detects it and stops the flow of current to the coils 56*b* and 56*b* of the relays 56 and 56. Thus, the contacts 56*a* and 56*a* open and interrupt the application of a high voltage to the high-voltage connectors 47 and 47.

To pull out the male connectors 47*b* and 47*b* from the female connectors 47*a* and 47*a* of the high-voltage connectors 47 and 47, it is necessary to press the unlocking buttons 47*c* and 47*c* on the male connectors 47*b* and 47*b*. However, when the interlock member 51 is mounted, the unlocking buttons 47*c* and 47*c* are hidden and thus cannot be pressed. To press the unlocking buttons 47*c* and 47*c*, it is necessary to loosen the two bolts 52 and 53 with a tool and remove the interlock member 51. Since the interlock connector 54 has already been pulled out, the bolt 52 (a fixing member) can be loosened with the tool without causing interference with the interlock connector 54. Thus, as illustrated in FIG. 6B, it is possible to remove the interlock member 51, press the unlocking buttons 47*c* and 47*c*, and pull out the male connectors 47*b* and 47*b* from the female connectors 47*a* and 47*a*.

Even if the operator attempts to remove the interlock member 51 without pulling out the interlock connector 54, the bolt 52 cannot be loosened due to interference of the tool with the interlock connector 54 as illustrated in FIG. 4. Thus, since the unlocking buttons 47*c* and 47*c* cannot be pressed and the male connectors 47*b* and 47*b* cannot be pulled out of the female connectors 47*a* and 47*a*, it is possible to prevent the occurrence of electric shock accidents.

Although embodiments of the present application have been described, various design changes can be made without departing from the scope of the present application.

For example, the present application is applicable not only to electric vehicles having only a motor generator as a running drive source, but also to hybrid vehicles having both an engine and a motor generator as a running drive source.

Also, the opening/closing operation member of the present application is not limited to the interlock connector 54 of the embodiments, but may be a switch or anything that outputs a signal for opening the relays 56 and 56 (a switch device, a switching circuit) to the battery ECU 57.

Also, the fixing member of the present application is not limited to the bolt 52 of the embodiments, but may be a clip or anything as long as the interlock member 51 can be secured in place.

The shape of the interlock member 51 is not limited to that in the embodiments described above.

According to a first aspect of the embodiment, a power supply system for an electric vehicle is proposed which includes a battery mounted on a vehicle body, a power line configured to supply power from the battery to the outside, a connector configured to removably connect the power line to the battery, a separating operation unit mounted on the connector and operated to disconnect the connector, an opening/closing unit capable of interrupting an electrical connection between the battery and the connector, an opening/closing operation member operated by an operator and configured to open the opening/closing unit to interrupt the electrical connection, and an interlock member configured to be movable between a first position that prohibits the operator from operating the separating operation unit and a second position that allows the operator to operate the separating operation unit. In the power supply system, when the opening/closing operation member is operated to interrupt the electrical connection made through the opening/closing unit, the interlock member can be moved to the second position.

In the configuration of the first aspect of the embodiment, when the opening/closing operation member is not being operated by the operator, the opening/closing unit is closed and a high voltage is applied to the connector to maintain the electrical connection between the battery and the connector. In this state, even if the operator attempts to move the interlock member from the first position to the second position to separate the connector, the interlock member disables the operation of the separating operation unit of the connector, so that accidental separation of the connector can be reliably prevented. When the operator operates the opening/closing operation member, the opening/closing unit is opened to interrupt the electrical connection between the battery and the connector, so that application of a high voltage to the connector is stopped. In this state, even when the operator moves the interlock member from the first position to the second position to separate the connector, safety can be ensured because a high voltage is no longer applied to the connector.

According to a second aspect of the embodiment, in the configuration of the first aspect, the interlock member is a plate-like member configured to cover the separating operation unit and secured to a fixed unit with a fixing member. When the opening/closing operation member is moved to a position that allows interruption of the electrical connection, removal of the fixing member is enabled.

In the configuration of the second aspect of the embodiment, the interlock member is a plate-like member configured to cover the separating operation unit and secured to the fixed unit with the fixing member. Therefore, when the opening/closing operation member is not being operated, the interlock member reliably covers the separating operation unit of the connector. This can reliably prevent operation of the separating operation unit and separation of the connector. When the opening/closing operation member is operated to interrupt the electrical connection, the opening/closing operation member is moved to a position which does not interfere with removal of the fixing member. Thus, by removing the fixing member, it is possible to move the interlock member from the first position to the second position, make the separating operation unit operable, and separate the connector.

Obviously, numerous modifications and variations of the present invention are possible in light of the above teachings. It is therefore to be understood that within the scope of the appended claims, the invention may be practiced otherwise than as specifically described herein.

What is claimed is:

1. A power supply system for an electric vehicle, comprising:
   a battery mounted on a vehicle body of the electric vehicle;
   a power line via which power is to be supplied from the battery to an electric apparatus provided in the electric vehicle;
   a connector to removably connect the power line to the battery;
   a separating operation device mounted on the connector and configured to be operated by an operator to disconnect the connector;
   a switch device configured to interrupt an electrical connection between the battery and the connector;
   a switching operation member configured to be operated by the operator to open the switch device to interrupt the electrical connection; and
   an interlock member movable from a first position to a second position so as to allow the operator to operate the separating operation device if the switching operation member has been operated by the operator to open the switch device to interrupt the electrical connection, the interlock member being configured to hide, at the first position, the separating operation device to prohibit the operator from operating the separating operation device, the interlock member being configured to allow, at the second position which is a different position from the first position, the operator to operate the separating operation device.

2. The power supply system according to claim 1, further comprising:
   a fixing member to secure the interlock member to a fixed device provided in the electric vehicle at the first position,
   wherein the interlock member covers the separating operation device to prohibit the operator from operating the separating operation device if the interlock member is disposed at the first position, and
   wherein the fixing member is removable from the fixed device if the switching operation member has been operated by the operator to move to a disconnecting position at which the switch device interrupts the electrical connection.

3. The power supply system according to claim 2,
   wherein the switch device is configured to make and interrupt the electrical connection between the battery and the connector, and
   wherein the switching operation member is movable between the disconnecting position and a connecting position at which the switch device makes the electrical connection.

4. The power supply system according to claim 3,
   wherein the switching operation member prohibits the operator from removing the fixing member from the fixed device when the switching operation member is disposed at the connecting position.

5. The power supply system according to claim 4,
   wherein the switch device comprises
      a detector configured to detect that the switching operation member is removed from the connecting position, and
      a switching circuit configured to interrupt the electrical connection between the battery and the connector if the detector detects that the switching operation member is removed from the connecting position.

6. The power supply system according to claim 2,
   wherein the fixed device comprises a battery housing in which the battery is provided.

7. The power supply system according to claim 1,
   wherein the electric apparatus comprises at least one of
      a motor generator configured to generate a driving force for the electric vehicle, and
      a control device configured to control the motor generator.

8. The power supply system according to claim 1,
   wherein the connector comprises
      a first connector connected to the battery, and
      a second connector connected to the power line and removably connected to the first connector, and
   wherein the separating operation device is configured to lock the second connector not to be removed from the first connector, and is configured to be operated by the operator to unlock the second connector to be removable from the first connector.

9. The power supply system according to claim 1,
   wherein the connector includes a male part and a female part and the separating operation device is configured to lock and unlock the connector, and wherein
   when the connector is locked, the male and female parts are locked together, and when the connector is unlocked, the connector is configured to be pulled by the operator to disconnect the male part and the female part and to physically disconnect the power line from the battery.

10. The power supply system according to claim 1,
    wherein the switch device interrupts the electrical connection between the battery and the connector in response to a removal of the switching operation member.

11. The power supply system according to claim 1, further comprising:
    a high-voltage connector box that houses the switch device,
    wherein the switching operation member is removably coupled to the high-voltage connector box such that the interlock member is movable to the second position only when the switching operation member is removed from the high-voltage connector box.

12. The power supply system according to claim 1, further comprising:
    a bolt that secures the interlock member in the first position,
    wherein the switching operation member prevents access to the bolt when the switching operation member is in electrical communication with the switch device.

13. The power line supply system according to claim 1,
    wherein the separating operation device includes a button on the connector, the button configured to be pressed to unlock the connector.

14. The power supply system according to claim 13,
    wherein the interlock member is a plate-like member that physically blocks the button when the interlock member is in the first position.

* * * * *